United States Patent
Kiyotani et al.

(10) Patent No.: US 6,682,576 B1
(45) Date of Patent: Jan. 27, 2004

(54) AIR FILTER MEDIUM, PROCESS OF PRODUCING FILTER MEDIUM, AIR FILTER PACK FOR AIR FILTERS, AND AIR FILTER UNIT FOR AIR FILTERS

(75) Inventors: Hideyuki Kiyotani, Settsu (JP); Osamu Inoue, Settsu (JP); Kunihiko Inui, Settsu (JP); Yoshiyuki Shibuya, Settsu (JP); Osamu Tanaka, Settsu (JP)

(73) Assignee: Daikin Industries, Osaka (JP)

( * ) Notice: Subject to any disclaimer, the term of this patent is extended or adjusted under 35 U.S.C. 154(b) by 0 days.

(21) Appl. No.: 09/708,458

(22) Filed: Nov. 9, 2000

(30) Foreign Application Priority Data

Aug. 24, 2000 (JP) ........................................ 2000-254572

(51) Int. Cl.⁷ ........................... B01D 39/16; B01D 46/10
(52) U.S. Cl. ............................ 55/486; 55/487; 55/495; 55/497; 55/524; 55/DIG. 5; 156/324
(58) Field of Search ............................ 55/486, 487, 495, 55/497, 500, 524, DIG. 5; 156/324, 389, 583.1

(56) References Cited

U.S. PATENT DOCUMENTS

| | | | | | |
|---|---|---|---|---|---|
| 3,779,838 A | * | 12/1973 | Wech | .......................... | 156/583 |
| 4,067,761 A | * | 1/1978 | Shirley | ....................... | 156/218 |
| 4,302,276 A | * | 11/1981 | Schulze | ...................... | 156/553 |
| 4,877,433 A | * | 10/1989 | Oshitari | ....................... | 55/486 |
| 5,476,567 A | * | 12/1995 | Fujisawa et al. | ............ | 156/389 |
| 5,571,413 A | * | 11/1996 | Mogami et al. | ............ | 210/489 |
| 5,772,884 A | | 6/1998 | Tanaka et al. | | |
| 5,910,277 A | * | 6/1999 | Ishino et al. | ................ | 264/127 |
| 6,027,553 A | * | 2/2000 | Hirano et al. | ............ | 55/DIG. 5 |
| 6,030,428 A | * | 2/2000 | Ishino et al. | ................... | 55/486 |
| 6,030,484 A | * | 2/2000 | Maeoka et al. | ................ | 55/486 |
| 6,149,702 A | * | 11/2000 | Kawano et al. | .......... | 55/DIG. 5 |
| 6,214,093 B1 | * | 4/2001 | Nabata et al. | ................ | 55/486 |
| 6,261,979 B1 | * | 7/2001 | Tanaka et al. | ................ | 55/521 |
| 6,271,155 B1 | * | 8/2001 | Noma et al. | ................ | 442/398 |
| 6,302,934 B1 | * | 10/2001 | Nabata et al. | ................ | 55/486 |

FOREIGN PATENT DOCUMENTS

| | | | |
|---|---|---|---|
| EP | 0917901 A1 | 5/1999 | |
| EP | 0917902 A1 | 5/1999 | |
| EP | 0963775 A2 | 12/1999 | |
| JP | 10-286415 | * 10/1998 | ........... B01D/39/16 |

* cited by examiner

*Primary Examiner*—Duane Smith
*Assistant Examiner*—Jason M. Greene
(74) *Attorney, Agent, or Firm*—Shinjyu Global IP Counselors, LLP (57) ABSTRACT

An air filter medium is provided with a porous film made from a polytetafluoroethylene, and a non-woven fabric laminated on at least one side of the porous film. The non-woven fabric has an apparent density satisfying the following equation: apparent density $(g/cm^3) < 1.5 \times$(basis weight $(g/m^2)/1000)+0.11$. The filter medium is produced by a process that includes a first step of producing a porous film formed from a polytetrafluoroethylene, and a second step of laminating a non-woven fabric on at least one side of the porous film on heating roll that has undergone a non-adhesive treatment. The filter medium is used to manufacture an air filter pack, while the air filter pack is used to manufacture an air filter unit.

12 Claims, 5 Drawing Sheets

AIR FILTER MEDIUM, PROCESS OF PRODUCING FILTER MEDIUM, AIR FILTER PACK FOR AIR FILTERS, AND AIR FILTER UNIT FOR AIR FILTERS

BACKGROUND OF THE INVENTION

1. Field of the Invention

This invention generally relates to air filter media. More specifically, the present invention relates to filter media for use in air cleaning operation of clean rooms, liquid crystals and/or semiconductor production devices. The present invention further relates to an air filter pack having the filter medium. The present invention still further relates to an air filter unit having the air filter pack.

2. Background Information

In a clean room or in a semiconductor production device, electronic parts such as semiconductors and liquid crystal display devices are produced in an environment in which the air is treated to capture floating particles. A porous film having polytetrafluoroethylene (hereinafter referred to as "PTFE" for simplicity) has been used as filter medium for high performance air filters used for cleaning air of such clean rooms, liquid crystals and/or semiconductor production devices. Such porous PTFE film is used usually in the form of a laminated film, with air-permeable supporting members interposing the porous PTFE film from both sides thereof in order to increase strength and easiness in handling.

Collection efficiency and pressure loss are generally known as properties that represent performance of an air filter medium. Specifically, collection efficiency shows the ability of a filter medium to capture floating fine particles in the air. Pressure loss indicates a degree of pressure loss of air that passes through the filter medium. Since porous PTFE film is made from finer fibers than fibers from which a conventional glass filter medium is made, PTFE porous film has high collection efficiency and small pressure loss.

However, when porous PTFE film is laminated by heat fusion with non-woven fabrics, or when the laminate is processed to be shaped into a predetermined shape, fiber structure of the porous PTFE film changes due to pressure from the non-woven fabric. As a result, defects may result in the filter medium, the pressure loss of the filter medium may increase, and/or the collection efficiency thereof may decrease.

In view of the above, there exists a need for filter medium which overcomes the above mentioned problems in the prior art. This invention addresses this need in the prior art as well as other needs, which will become apparent to those skilled in the art from this disclosure.

SUMMARY OF THE INVENTION

Accordingly, an object of the present invention is to provide an air filter medium having high performance by reducing an increase in its pressure loss and a decrease in its collection efficiency.

Another object of the present invention is to provide a process of manufacturing the high performance air filter medium.

Still another object of the present invention is to provide an air filter pack having the high performance air filter medium.

Yet still another object of the present invention is to provide an air filter unit having the air filter pack.

According to a first aspect of the present invention, an air filter medium is used for air cleaning, and comprises a porous film and a non-woven fabric. The porous film is made of a polytetrafluoroethylene. The non-woven fabric is laminated on at least one side of the porous film. The non-woven fabric on at least one side of the porous film has an apparent density satisfying the following equation:

apparent density $(g/cm^3) < 1.5 \times$(basis weight $(g/m^2)$/1000)+0.11.

It has been found through studies by the applicants of the present invention that hardness of the non-woven fabric used in the air filter medium contributes to the degree of damage that the porous PTFE film receives in laminating the film or other occasions. Further, the applicants have also found that an apparent density of the non-woven fabric is one of factors that determine the hardness of the non-woven fabric.

In view of the above findings, according to the first aspect of the present invention, a non-woven fabric having an apparent density of less than a predetermined value is laminated on at least one side of the porous PTFE film. More specifically, a non-woven fabric softer than the conventional one is laminated on the porous PTFE film. Owing to this structure, the degree of damage that the porous PTFE film receives from the non-woven fabric at the time of lamination is decreased. Also, the degree of increase in pressure loss of the air filter medium and the degree of decrease in collection efficiency thereof are suppressed. As a result, a high performance air filter medium can be obtained.

According to a second aspect of the present invention, in the air filter medium of the first aspect of the present invention, the non-woven fabric on at least one side of the porous film has a compressibility satisfying the following equations:

compressibility $(\%) < 0.2 \times$(basis weight $(g/m^2)$)+66, and compressibility $(\%) = (d_{1000} (\mu m)/d_{20} (\mu m)) \times 100$, where $d_{1000}$ ($\mu m$) is a thickness ($\mu m$) under a load of 98 (kPa), and $d_{20}$ ($\mu m$) is a thickness ($\mu m$) under a load of 1.96 (kPa).

In the conventional air filter medium, a relatively hard material has been used as a non-woven fabric for the supporting material. As a result, the damage that the porous P film receives was large. It has been found through the studies by the applicants of the present invention that compressibility of the non-woven fabric is one of factors that determine the hardness of the non-woven fabric.

Therefore, in the air filter medium according to the second aspect of the present invention, a non-woven fabric having a compressibility of less than a predetermined value is laminated on at least one side of the porous PTFE film. More specifically, a non-woven fabric softer than the conventional one is laminated on the porous PTFE film. Owing to this structure, the degree of damage that the porous PTFE film receives from the non-woven fabric at the time of lamination is decreased, and the degree of increase in pressure loss of the air filter medium and the degree of decrease in collection efficiency thereof are suppressed. As a result, a high performance air filter medium can be obtained.

According to a third aspect of the present invention, in the air filter medium of the first or second aspect of the present invention, the non-woven fabric on at least one side of the porous film is made of composite fibers having a core-shell structure having a core portion and a shell portion. The core portion is made of a first material with a first melting point. The shell portion is made of a second material with a second melting point. The first melting point is higher than the second melting point.

It has been found through the studies by the applicants of the present invention that, in heat laminating the non-woven fabric made of composite fibers having a core-shell structure on the porous PTFE film, the shell portion is adhered to the porous PTFE film at many fine points, whereby an adhesive layer which is difficult to peel is formed. Also, the air filter medium is prevented from clogging. The applicants have also found that almost no heat shrinkage takes place in the non-woven fabric made of core-shell composite fibers at the time of lamination.

In view of the above findings, according to the third aspect of the present invention, the air filter medium uses the non-woven fabric formed from core-shell composite fibers, and the non-woven fabric has the apparent density or the compressibility having a value less than the predetermined value.

In such an air filter medium, almost no heat shrinkage takes place in the non-woven fabric when the fabric is subjected to heat lamination, and as a result, the degree of damage that the porous PTFE film receives from the non-woven fabric at the time of lamination is suppressed effectively.

According to fourth to sixth aspects of the present invention, a process of producing an air filter medium is a production process of the air filter medium of the first, second and third aspects of the present invention. The process of producing an air filter medium includes a first step and a second step. The first step is for producing a porous film, and the second step is for laminating a non-woven fabric on the porous film on a heating roll, which has undergone a non-adhesive treatment.

In producing the air filter medium, the step of heat laminating the non-woven fabric on the porous PTFE film is generally carried out such that the porous PTFE film and the non-woven fabric are bonded to each other by heat fusion through heat from the heating roll.

However, when a side of the non-woven fabric which is in contact with the heating roll is heated by the heating roll, the side becomes viscous. As a result, adhesive force is generated between the heating roll and the non-woven fabric and peeling takes place between the non-woven fabric and the porous PTFE film. As a result, the porous PTFE film is damaged to cause defects in the air filter medium and deterioration of performance thereof.

In view of the above, according to the fourth to sixth aspects of the present invention, the production process is conducted such that the non-woven fabric is laminated on the porous film on a heating roll which has been subjected to non-adhesive treatment. This structure makes it possible to suppress generation of adhesive force between the non-woven fabric and the heating roll in heat laminating the non-woven fabric on the porous PTFE film, thereby suppressing more effectively the defects in the air filter medium, and the degrees of increase in pressure loss and decrease in collection efficiency of the filter medium. As a result, a high performance air filter medium can be obtained.

Examples of the heating roll which has been subjected to non-adhesive treatment include: rolls obtained by covering the heating roll with a non-adhesive sheet composed of a sheet-like reinforced fiber material layer impregnated with an organic polymeric material that is non-adhesive; rolls obtained by coating the roll surface with an organic polymeric material that is non-adhesive; and rolls the surface of which is formed from rubbers containing non-adhesive polymeric materials.

There is no particular limitation put to the organic polymeric material that is non-adhesive. Examples of the non-adhesive, organic polymeric material include synthetic resins such as fluorine resin, silicone resin or olefin resin, rubbers containing these synthetic resins, and elastomers containing these synthetic resins, and the like.

Examples of the reinforced fiber material include polyester type synthetic fibers, nylon type synthetic fibers, aramid fibers, glass fibers, carbon fibers and ceramic fibers, or the like.

According to a seventh aspect of the present invention, in the process of producing a filter medium according to the fourth aspect of the present invention, the non-adhesive treatment includes covering with a non-adhesive sheet a surface of the heating roll; and the non-adhesive sheet is formed by impregnating a sheet made of a glass fiber material with a fluorine resin material.

It has been found through the studies by the applicants of the present invention that, when the heating roll is covered with the non-adhesive sheet, almost no adhesive force is generated between the non-woven fabric and the heating roll, thus making the non-woven fabric excellent in terms of easiness in peeling.

Thus, according to the seventh aspect of the present invention, the production process of the air filter medium uses the heating roll covered with the above-described non-adhesive sheet. Owing to this structure, the non-woven fabric can easily be peeled from the heating roll after heat lamination. As a result, the degree of damage that the porous PTFE film receives from the non-woven fabric can be minimized. Further, this structure facilitates cleaning of the heating roll and replacement of the non-adhesive sheet.

According to eighth to tenth aspects of the present invention, an air filter pack for air filters includes a filter medium of the first to third aspects of the present invention having a predetermined shape.

The air filter medium is mainly used as a component of an air filter unit that will be discussed later. For this reason, the filter medium is processed into a predetermined shape. For example, the filter medium is folded in an accordion fashion with each fold having a given width. The air filter medium which is processed into a predetermined shape is referred to as an air filter pack.

The air filter pack uses as the non-woven fabric a material having an apparent density less than the predetermined value, i.e., a softer material compared with the conventional ones. This decreases damage that the porous PTFE film receives when the filter medium is processed into a predetermined shape. Thus, formation of defects in the air filter pack can be suppressed.

According to a tenth aspect of the present invention, in the air filter pack of the eight aspect of the invention, the non-woven fabric on at least one side of the porous film is made of composite fibers having a core-shell structure with a core portion and a shell portion. The core portion is made of a first material with a first melting point, and the shell portion is made of a second material with a second melting point. The first melting point is higher than the second melting point.

According to eleventh to thirteenth aspects of the present invention, an air filter unit for air cleaning comprises a frame and an air filter pack having a filter medium of the first to third aspects of the present invention with a predetermined shape that is coupled to the frame.

The air filter unit uses a material having an apparent density less than the predetermined value, i.e., a softer material compared with the conventional ones, as the non-woven fabric used in the air filter medium. This decreases damage that the porous PTFE film receives from the non-woven fabric when forming the air filter unit. Thus, formation of defects in the air filter unit can be suppressed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention are provided for illustration only, and not for the purpose of limiting the invention as defined by the appended claims and their equivalents.

Air Filter Unit

Figure 1:
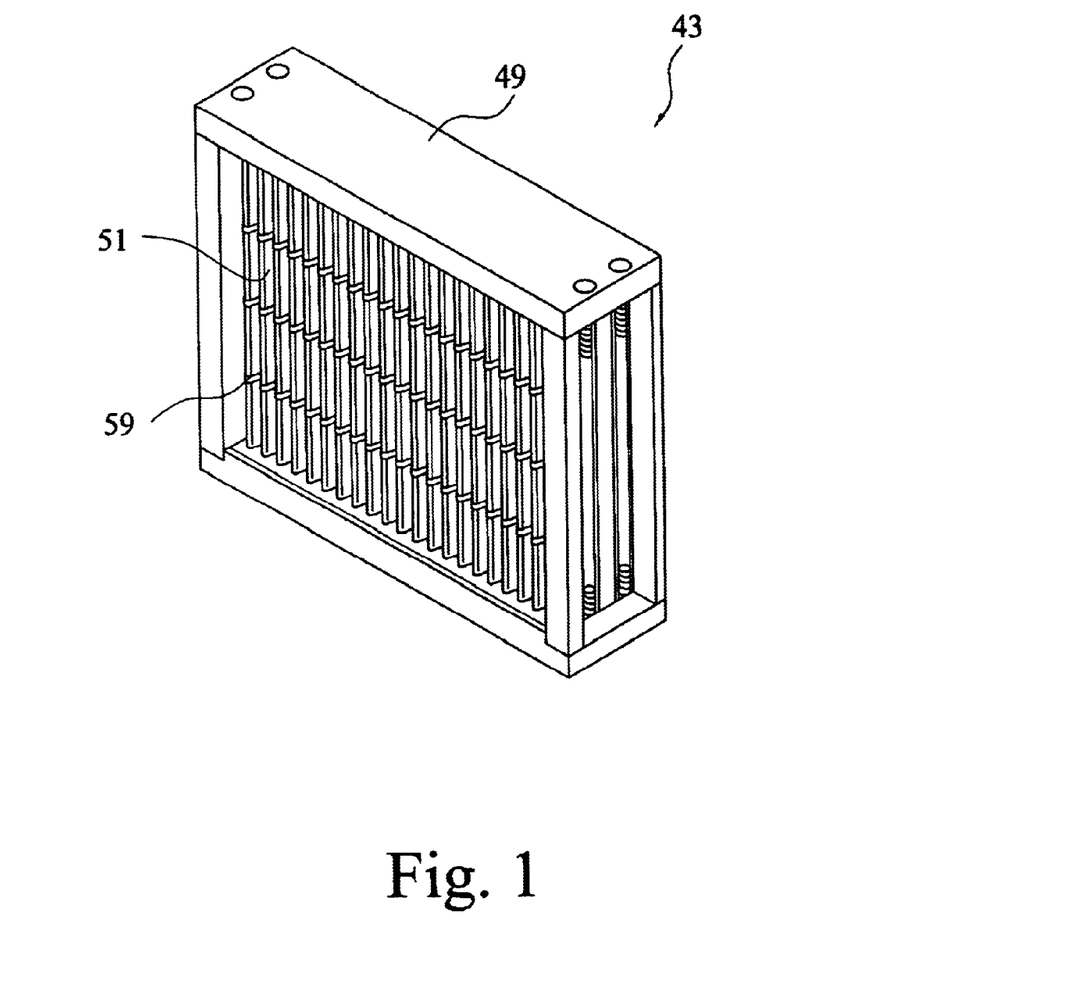
FIG. 1 is a perspective view showing an air filter unit in accordance with an embodiment of the present invention.

Referring initially to FIG. 1, an air filter unit 43 is illustrated in accordance with one embodiment of the present invention. The air filter unit 43 is basically equipped with a frame 49 and a filter medium 51. The filter medium 51 is incorporated in the frame 49 to form a single unit.

The filter medium 51 is mainly used as a component of an air filter unit 43. For this reason, the filter medium 51 is processed into a predetermined shape, such as a shape of an accordion with each fold having a predetermined width. The filter medium 51 that is processed into a predetermined shape is referred to as an air filter pack.

Figure 2:
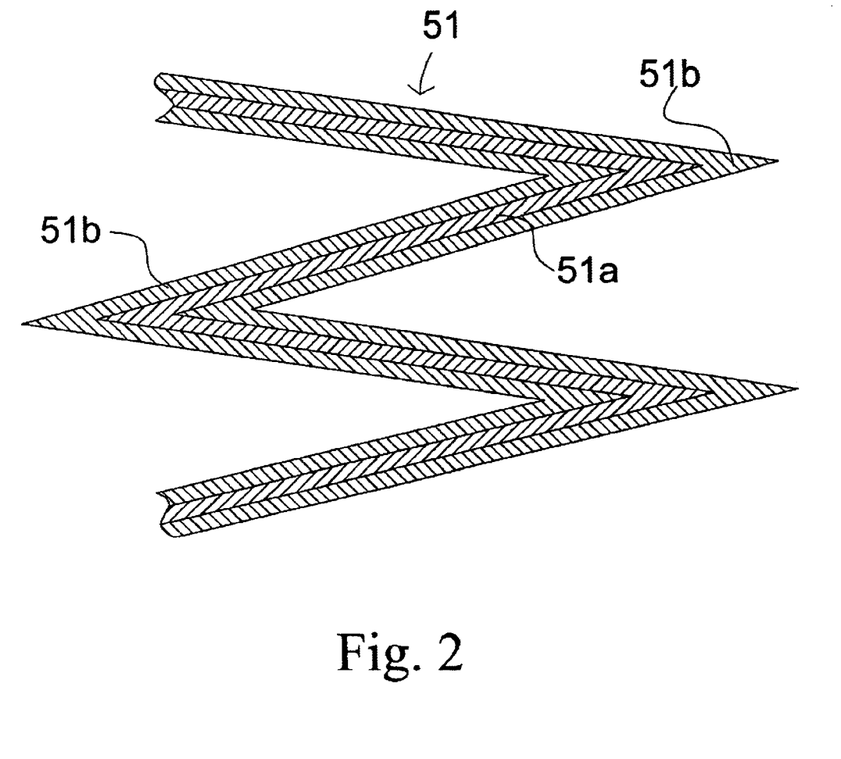
FIG. 2 is a partial diagrammatic cross-sectional view of a portion of an air filter medium for use in the air filter unit shown in FIG. 1.

Referring now to FIG. 2, filter medium 51 is a sheet material comprising a porous PTFE film 51a and two supporting layers 51b of air-permeable supporting material arranged so as to interpose the porous PTFE film 51a between the two supporting layers 51b of the air-permeable support material. The porous PTFE film 51a and the supporting layers 51b of the air-permeable supporting material are laminated by heat fusion. Although the porous PTFE film 51a here is one layer, the PTFE film can have a plurality of layers to be used in a form of a laminate film.

The porous PTFE film 51a has a thickness of about 1 $\mu$m to 60 $\mu$m, and a fiber diameter of about 0.05 $\mu$m to 0.2 $\mu$m, preferably 0.05 $\mu$m to 0.14 $\mu$m, more preferably about 0.05 $\mu$m to 0.1 $\mu$m. Performance Factor (hereinafter referred to as PF for simplicity) value of the porous PTFE film 51a is more than about 22, preferably more than about 25. PF value is a factor that indicates performance of the filter medium 51 based on collection efficiency and pressure loss. PF value will be discussed in more detail below.

The air-permeable supporting layers 51b are each a non-woven fabric having a basis weight of about 15 to 100 g/m², preferably about 20 to 70 g/m². This non-woven fabric has an apparent density satisfying Equation 1 as follows:

$$\text{apparent density (g/cm}^3) < 1.5 \times \text{basis weight (g/m}^2)/1000 + 0.11.$$

Also, this non-woven fabric has a compressibility satisfying Equations 2 as follows:

$$\text{compressibility (\%)} < 0.2 \times \text{basis weight (g/m}^2) + 66, \text{ and}$$

$$\text{compressibility (\%)} = d_{1000}\,(\mu\text{m})/d_{20}\,(\mu\text{m}) \times 100,$$

where $d_{1000}$ ($\mu$m) is a thickness ($\mu$m) of the air-permeable supporting layer 51b under a load of 98 (kPa), and $d_{20}$ ($\mu$m) is the thickness ($\mu$m) under a load of 1.96 (kPa).

In this description, where a non-woven fabric satisfies the Equation 1, the fabric is referred to as "soft". Conversely, if the non-woven fabric does not meet the Equation 1, the fabric is referred to as "hard". Similarly, if a non-woven fabric satisfies the Equations 2, the fabric is referred to as "soft", and if not, the fabric is referred to as "hard".

The non-woven fabric is made of thermoplastic resins such as polyolefin (e.g., polyethylene or polypropylene), polyester, ethylene-vinyl acetate copolymer, polyvinyl chloride and polyvinylidene chloride. Alternatively, the non-woven fabric has a shell portion that is made of those thermoplastic resins, and a core portion that is made of a material whose melting point is higher than that of the material of the shell portion.

The filter medium 51 having the aforesaid construction has a pressure loss of 98 to 980 pa when an air is passed through the filter medium at a flow velocity of 53 mm/sec. Also, the filter medium 51 has collection efficiency of 99.0% or more, preferably 99.9% or more, more preferably 99.99% or more, where dioctyl phtalate (hereinafter referred to as DOP for simplicity) having a particle size of 0.10 to 0.12 $\mu$m is the particle to be collected.

As seen in FIG. 2, the filter medium 51 is formed into a wave shape by alternatively folding back in every width of 15 to 150 mm. A space between adjacent folds is maintained at about 2 to 15 mm by a spacer or a wave shape separator. This folded filter medium 51 is called an air filter pack.

The frame 49 is formed by assembling four aluminum-made frame materials. The air filter pack is incorporated in the inside space of the frame 49 such that the filter medium 51 is maintained in a predetermined shape by the spacer 59. The frame 49 and the filter medium 51a re sealed with an adhesive in order to maintain an air-tightness. The air filter pack incorporated in the frame 49 is called an air filter unit 43.

The applicants of the present invention have found that hardness of the non-woven fabric used in the air filter medium contributes to the degree of damage that the porous PTFE film receives in laminating the film or other occasions. Further, the applicants have also found that an apparent density of the non-woven fabric is one of factors that determine the hardness of the non-woven fabric.

In view of the above findings, the non-woven fabric layer 51b having an apparent density of less than a predetermined value is laminated on at least one side of the porous PTFE film 51a. More specifically, the non-woven fabric layers 51b, which are softer than conventional fabric are laminated on the porous PTFE film.

Further, in a conventional PTFE air filter medium, a relatively hard material has been used as a non-woven fabric for the supporting material. As a result, the damage that the porous PTFE film receives is large. The applicants of the present invention have found that compressibility of the non-woven fabric is one of factors that determine the hardness of the non-woven fabric.

Therefore, in the air filter medium, non-woven fabric layers 51b having a compressibility of less than a predetermined value are laminated on at least one side of the porous PTFE film 51a. More specifically, non-woven fabric layers 51b, which are softer than the conventional ones are laminated on the porous PTFE film 51a. Therefore, damage that the porous PTFE film 51a receives from the non-woven fabric layers 51b at the time of lamination is decreased. Accordingly, an increase in pressure loss of the filter medium 51a nd a decrease in collection efficiency thereof are suppressed. As a result, a high performance filter medium 51 can be obtained.

Further, the applicants of the present invention have found that, in heat laminating the non-woven fabric layers 51b made of composite fibers that have a core-shell structure on the porous PTFE film 51a, the shell portion is adhered to the porous PTFE film at many fine points, thereby making an adhesive layer difficult to peel. Accordingly, the air filter medium 51 is prevented from clogging. The applicants have also found that almost no heat shrinkage takes place at the time of lamination if the non-woven fabric layers are made of core-shell composite fibers.

In view of the above findings, the filter medium 51 uses the non-woven fabric formed from core-shell composite fibers. Additionally, the non-woven fabric layers 51b have the apparent density or the compressibility having a value less than the predetermined value. Therefore, almost no heat shrinkage takes place in the non-woven fabric layers 51b when the fabric is subjected to heat of lamination. As a result, the degree of damage that the porous PTFE film 51a receives from the non-woven fabric layers 51b at the time of lamination is suppressed effectively.

Manufacturing Process of Filter Medium

A process of producing the air filter medium 51 according to an embodiment of the present invention includes a first step and a second step. In the first step, the porous PTFE film is manufactured. In the second step, utilizing a heat fusion apparatus shown in FIG. 5, the layers of non-woven fabric 51b are laminated on the porous PTFE film 51a by heat fusion. Heat roll 19 that applies heat to the filter medium 51 has undergone a non-adhesive treatment, in which the surface of the heating roll 19 is covered with a non-adhesive sheet. This non-adhesive sheet is obtained by impregnating a sheet that is made of a reinforced fiber material (preferably glass fiber material) with a non-adhesive organic polymeric material (preferably fluorine resin material).

Generally, in manufacturing the air filter medium, the step of heat laminating the non-woven fabric on the porous PTFE film is carried out such that the porous PTFE film and the non-woven fabric are adhered to one another by heat fusion from heat of the heating roll.

However, a side of the non-woven fabric that is in contact with the heating roll is heated by the heating roll to cause fusion, whereby adhesive force is generated between the heating roll and the non-woven fabric. As a result, peeling takes place between the non-woven fabric and the porous PTFE film. Consequently, the porous PTFE film is damaged, causing defects in the filter medium and deteriorating the performance.

Figure 5:
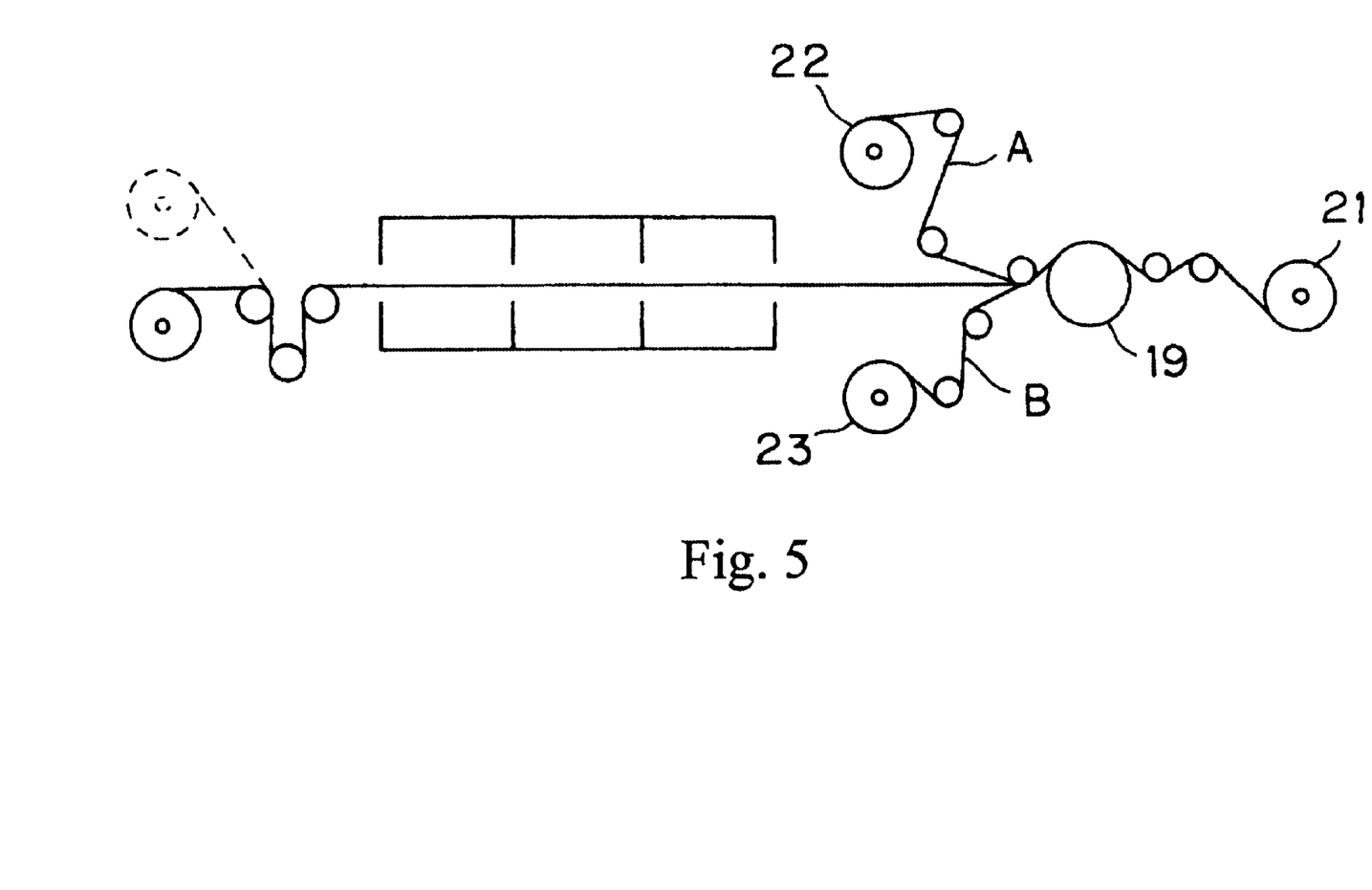
FIG. 5 is a schematic view showing an apparatus used to stretch a PTFE film in a width direction (left half) and an apparatus that laminates an air-permeable supporting member on the PTFE film (right half)

In this production process of the present invention, however, the non-woven fabric layer 51b is laminated on the porous film 51a on heating roll 19 which has undergone a non-adhesive treatment. Especially, the applicants of the present invention have found that, when the non-adhesive sheet is applied to the heating roll, almost no adhesive force is generated between the non-woven fabric and the heating roll, thus making it easy to peel the non-woven fabric.

Therefore, it is possible to suppress generation of adhesive force between the non-woven fabric layers 51b and the heating roll 19 in heat laminating the non-woven fabric layers 51b on the porous PTFE film 51a, thereby suppressing effectively the defects in the filter medium 51. Further, by utilizing a non-adhesive sheet, the non-woven fabric layers 51b can easily be peeled from the heating roll 19 after heat lamination. This structure also facilitates cleaning of the heating roll 19 and replacement of the non-adhesive sheet. Accordingly, an increase in pressure loss and a decrease in collection efficiency of the filter medium 51 are suppressed. As a result, a high performance filter medium for air filters can be obtained.

Examples of the heating roll 19 which has undergone a non-adhesive treatment include: rolls obtained by covering the heating roll with a non-adhesive sheet composed of a sheet-like reinforced fiber material layer impregnated with an organic polymeric material that is non-adhesive; rolls obtained by coating the roll surface with an organic polymeric material that is non-adhesive; and rolls the surface of which is formed from rubbers containing non-adhesive polymeric materials.

There is no particular limitation to the organic polymeric material that is non-adhesive. Examples of the organic polymeric material to be used include synthetic resins such as fluorine resin, silicone resin, olefinic resin, rubbers having these resins, and elastomers having these resins. Examples of the reinforced fiber material to be used include fiber material such as polyester resin, nylon resin, aramid resin, glass fiber, carbon fiber or ceramic fiber.

Performance Tests

In the performance tests that follow, pressure loss, collection efficiency, penetration and PF value of porous PTFE film 51a and filter medium 51, apparent density and compressibility of the non-woven fabric layers 51b, and pressure loss, collection efficiency, penetration and PF value of the air filter unit 43 were measured as explained below.

Pressure Loss (Pa) of Porous PTFE Film and Air Filter Medium

Samples of porous PTFE film 51a and filter medium 51 were set in a circular holder, which has a diameter of 105 mm. Inlet side was pressurized with a compressor to blow air to the samples. A flow velocity of the air passing through the film or the filter medium was set to 5.3 cm/sec by a flow meter. Pressure loss of the outcoming air was measured with a manometer.

Collection Efficiency (%) of Porous PTFE Film and Air Filter Medium

Samples of porous PTFE film 51a and filter medium 51 were set in a circular holder, which has a diameter of 105 mm. Upstream side was pressurized with a compressor to blow air to the samples. A flow velocity of the air passing through the film or the filter medium was set to 5.3 cm/sec by a flow meter. Thereafter, polydisperse DOP particles having a particle size of 0.10 to 0.12 $\mu$m and a particle concentration of $10^8$/300 ml was released from the upstream side. On the downstream side, the number of the particles that passed the film was counted with a particle counter (e.g. "PMS LAS-X-CRT", a product of Particle Measuring System INC. (PMS)). Then, the ratio between the number of particles released on the upstream side and the number of particles counted on the downstream side was determined. Where particle concentration on the upstream side is Ci, and particle concentration on the downstream side is Co, the collection efficiency was calculated by the following Equation 3:

collection efficiency (%)=(1−Co/Ci)×100.

Since the filter medium 51 has very high collection efficiency, the measurement of the collection efficiency was conducted with a long suction time and an increased amount of sample air. For example, where the suction time is 10 times longer, the counted number of particles on the downstream side becomes 10 times greater, thereby increasing the measurement sensitivity by 10 times.

Penetration (%) of Porous PTFE Film and Air Filter Medium

Penetration of porous PTFE film 51a and filter medium 51 was measured by the following Equation 4:

penetration (%)=100−collection efficiency (%).

PF Value of Porous PTFE Film and Air Filter Medium

PF value of porous PTFE film 51a and filter medium 51 (hereinafter referred to as $PF_1$ value) is a parameter that indicates the performance of the film; the more the $PF_1$ value is, the better the performance of the film is. More specifically, as seen in Equation 5, the $PF_1$ value increases as the penetration decreases and the pressure loss decreases. Conversely, the $PF_1$ value decreases as the penetration increases and the pressure loss increases. The $PF_1$ value was obtained by inserting the pressure loss and penetration of the film obtained above in the following Equation 5:

$PF_1$ value=[−log (penetration (%)/100)/(pressure loss (pa)/9.8)]×100.

Apparent Density of Non-woven Fabric

Apparent density of non-woven fabric was measured by the following Equation 6:

apparent density (g/cm³)=basis weight (g/m²)/thickness (μm).

Compressibility of Non-woven Fabric

Four pieces of non-woven fabric each having a size of 10 cm×10 cm and loads of 98 kPa and 1.96 kPa were provided. One of the loads was applied to a stack of four samples using a measuring device (e.g. "Pressure-Type Thickness Compression Measuring Device", a product of Koa Shokai K. K.) with a gauge head having a diameter of 10 mmφ. The thickness of the stack measured at the central portion of the samples divided by four is the thickness of each sample non-woven fabric sheet. After repeating this measurement twice, the average value of the measured thickness was determined to be the thickness of non-woven fabric under each load of 98 kPa and 1.96 kPa. Compressibility of non-woven fabric was calculated by the following Equation 7:

compressibility (%)=($d_{1000}$ (μm)/$d_{20}$ (μm))×100, where $d_{1000}$ (μm) is the thickness (μm) under a load of 98 (kPa), and $d_{20}$ (μm) is the thickness (μm) under a load of 1.96 (kPa).

Pressure Loss (Pa) of Air Filter Unit

Figure 3:
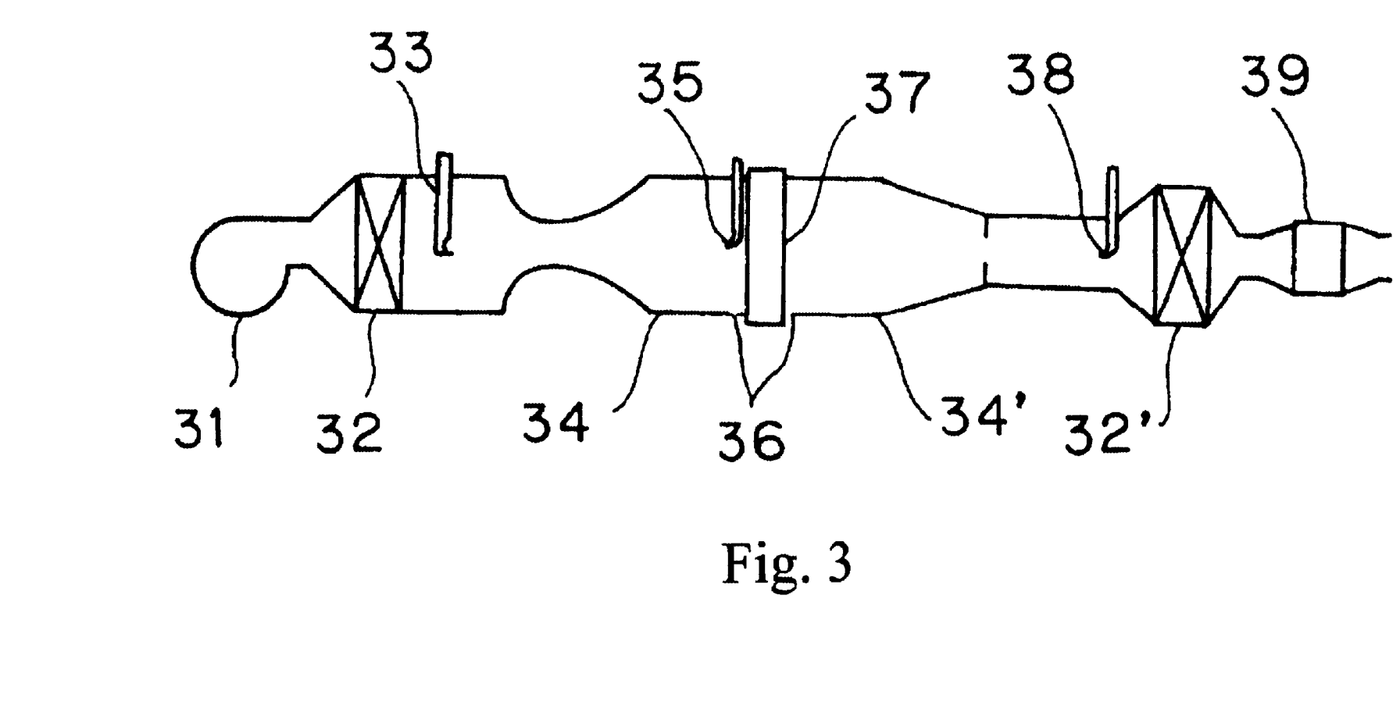
FIG. 3 is a schematic view showing a device for measuring pressure loss of an air filter unit.

The pressure loss of the air filter unit 43 was measured using a pressure loss/penetration measurement device shown in FIG. 3. First, the air filter unit 43 was mounted, and the velocity of air flow that passes through the filter medium 51 was adjusted to 1.4 cm/sec. Pressure loss of the air flow that comes out of the air filter unit 43 was measured with a manometer.

In FIG. 3, the pressure loss/penetration measurement apparatus includes a fan 31, HEPA (high efficiency particulate air) filters 32 and 32', an inlet 33 for testing particles, straightening vanes 34 and 34', a sampling tube 35 for testing particles on the upstream side, a static pressure measuring hole 36, a testing air filter unit 37, a sampling tube 38 for testing particles on downstream side, and a laminar flow type flow meter 39.

Collection Efficiency (%) of Air Filter Unit

The collection efficiency of the air filter unit 43 was measured using the pressure loss/penetration measurement device shown in FIG. 3. First, the air filter unit 43 was mounted, and the velocity of air flow that passes through the filter medium 51 was adjusted to 1.4 cm/sec. Thereafter, DOP particles having a particle a size of 0.1 to 0.12 μm and a particle concentration of $1 \times 10^9/ft^3$ was released from the upstream side. On the downstream side, the number of released particles was counted using a particle counter. The ratio between the number of particles released on the upstream side and the number of particles counted on the downstream side was determined. Where particle concentration on the upstream side is Ci and particle concentration on the down stream side is Co, the collection efficiency of the air filter unit 43 was calculated by the following Equation 8:

collection efficiency (%)=(1-Co/Ci)×100.

Penetration (%) of Air Filter Unit

Penetration of the air filter unit 43 was obtained by the following Equation 9:

penetration (%)=100−collection efficiency (%).

PF Value of Air Filter Unit $PF_2$ value of the air filter unit 43 was obtained by the following Equation 10:

$PF_2$ value=[−log (penetration (%)/100)/(pressure loss (Pa)/9.8)]×100.

Production of Porous PTFE Film

EXAMPLE 1

Twenty eight (28) weight portions of a hydrocarbon oil (e.g. "IP-2029", a product of Idemitsu Petrochemical Co.) as the lubricant were added to 100 weight portions of PTFE fine powder (e.g. "Polyfron Fine Powder F-104U", a product of Daikin Industry Co.), which has a number average molecular weight of 6,200,000. Then, these components were mixed.

This mixture was shaped into a rod shape by paste extrusion. This rod-shaped mixture was further shaped into a film shape by calender rolls that were heated to 70° C. In this manner, a PTFE film was obtained. The PTFE film was passed through a hot air drying oven at 200° C. to dry and remove the lubricant, thereby obtaining an unsintered PTFE film having an average thickness of 200 μm and an average width of 155 mm.

Figure 4:
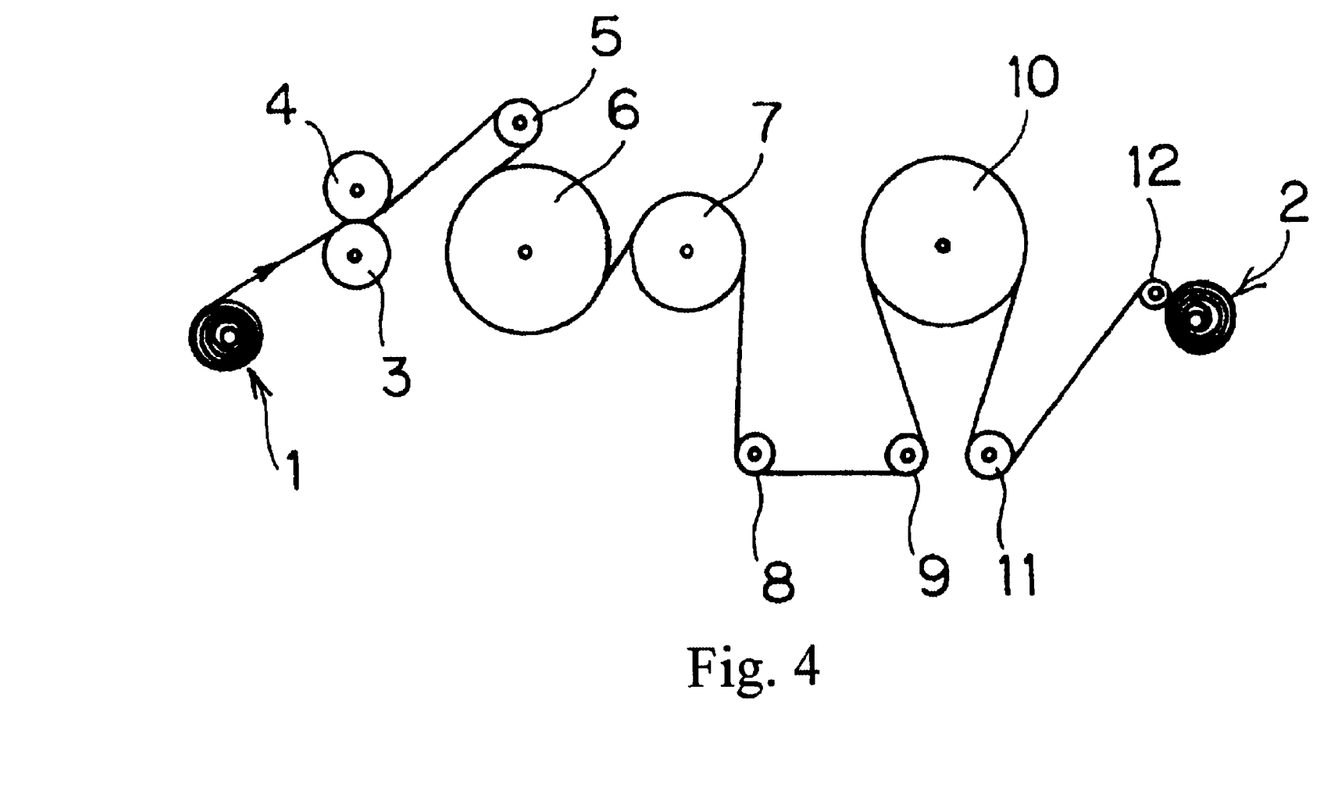
FIG. 4 is a schematic view showing a stretching apparatus that stretches a PTFE film in a longitudinal direction.

Next, this unsintered PTFE film was stretched so as to be 5 times larger in a longitudinal direction, using an apparatus shown in FIG. 4. The unsintered film was set on a roll 1, and the stretched film was wound with a winding roll 2. Stretch temperature was 250° C. The apparatus in FIG. 4 further includes rolls 3–5, heating rolls 6 and 7, and rolls 8–12.

The longitudinally stretched film thus obtained was further stretched so as to be 30 times larger in a width direction using a tenter shown in the left half of FIG. 5. The tenter pinched the film with clips continuously. At the same time, heat setting was conducted to obtain a porous PTFE film. At this time, stretch temperature was 290° C., heat setting temperature was 360° C., and the rate of stretching was 330%/sec.

Lamination of Non-woven Fabric

In the following Examples 2–5 and Comparative Examples 1–4, lamination of non-woven fabric on the porous PTFE film obtained in Example 1 was conducted as explained below.

As shown in FIG. 5, non-woven fabric A was unwound from an unwinding roll 22, and non-woven fabric B, which is on a side that is in contact with a heating roll 19 was unwound from an unwinding roll 23. Those non-woven fabrics A and B were laminated on each side of the stretched porous PTFE film by heat fusion on the heating roll 19. Thereafter, the laminate was wound with a winding roll 21.

Tension applied to the non-woven fabric A was adjusted by a brake (not shown in figures) arranged on the unwinding roll 22. In this case, tension of the non-woven fabric A was adjusted to 90 g/cm. Line speed was 10 m/min and temperature of the heating roll 19 was 160° C. The heating roll 19 had undergone a non-adhesive treatment, in which a metal surface of the heating roll 19 was covered with PTFE-impregnated glass cloth sheet (e.g. "Chuko Flow AGF-400", a product of Chuko Kasei Kogyo K. K.).

EXAMPLE 2

The second example of the air filter medium was obtained by laminating non-woven fabrics A and B described below on the porous PTFE film obtained in Example 1, using the apparatus shown in FIG. 5.

Non-woven fabric A: ELEVES S0403WDO, a product of Unitika Ltd., PET/PE core/shell non-woven fabric, basis weight: 40 g/m$^2$, apparent density: 0.143 g/cm$^3$ ("soft" according to the Equation 1), compressibility: 70.9% ("soft" according to the Equation 2).

Non-woven fabric B: ELEVES S0403WDO, a product of Unitika Ltd.

EXAMPLE 3

The third example of the air filter medium was obtained by laminating non-woven fabrics A and B described below on the porous PTFE film obtained in Example 1, using the apparatus shown in FIG. 5.

Non-woven fabric A: ELEVES S0503WDO, a product of Unitika Ltd., PET/PE core/shell non-woven fabric, basis weight: 50 g/m$^2$, apparent density: 0.152 g/cm$^3$ (soft), compressibility: 72.4% (soft).

Non-woven fabric B: ELEVES S0503WDO, a product of Unitika Ltd.

EXAMPLE 4

The fourth example of the air filter medium was obtained by laminating non-woven fabrics A and B described below on the porous PTFE film obtained in Example 1, using the apparatus shown in FIG. 5.

Non-woven fabric A: ELEVES S0403WDO, a product of Unitika Ltd., basis weight: 40 g/m$^2$, apparent density: 0.143 g/cm$^3$ (soft), compressibility: 70.9% (soft).

Non-woven fabric B: ELEVES T0403WDO, a product of Unitika Ltd., PET/PE core/shell non-woven fabric, basis weight: 40 g/m$^2$, apparent density: 0.200 g/cm$^3$ (hard), compressibility: 75.5% (hard).

EXAMPLE 5

The fifth example of the air filter medium was obtained by laminating non-woven fabrics A and B described below on the porous PTFE film obtained in Example 1, using the apparatus shown in FIG. 5.

Non-woven fabric A: ELEVES S0503WDO, a product of Unitika Ltd., basis weight: 50 g/m$^2$, apparent density: 0.152 g/cm$^3$ (soft), compressibility: 72.4% (soft).

Non-woven fabric B: ELEVES T0503WDO, a product of Unitika Ltd., PET/PE core-shell non-woven fabric, basis weight: 50 g/m$^2$, apparent density: 0.227 g/cm$^3$ (hard), compressibility: 77.8% (hard).

COMPARATIVE EXAMPLE 1

The first comparative example of the air filter medium was obtained by laminating non-woven fabrics A and B described below on the porous PTFE film obtained in Example 1, using the apparatus shown in FIG. 5.

Non-woven fabric A: ELEVES T0403WDO, a product of Unitika Ltd., basis weight: 40 g/m$^2$, apparent density: 0.200 g/cm$^3$ (hard), compressibility: 75.5% (hard).

Non-woven fabric B: ELEVES T0403WDO, a product of Unitika Ltd.

COMPARATIVE EXAMPLE 2

The second comparative example of the air filter medium was obtained by laminating non-woven fabrics A and B described below on the porous PTFE film obtained in Example 1, using the apparatus shown in FIG. 5.

Non-woven fabric A: ELEVES T0503WDO, a product of Unitika Ltd., basis weight: 50 g/m$^2$, apparent density: 0.227 g/cm$^3$ (hard), compressibility: 77.8% (hard).

Non-woven fabric B: ELEVES T0503WDO, a product of Unitika Ltd.

COMPARATIVE EXAMPLE 3

The third comparative example of the air filter medium was obtained by laminating non-woven fabrics A and B described below on the porous PTFE film obtained in Example 1, using the apparatus shown in FIG. 5.

Non-woven fabric A: ELEVES T0703WDO, a product of Unitika Ltd., PET/PE core/shell non-woven fabric, basis weight: 70 g/m$^2$, apparent density: 0.269 g/cm$^3$ (hard), compressibility: 84.5% (hard).

Non-woven fabric B: ELEFIT E0303WDO, a product of Unitika Ltd., basis weight: 30 g/m$^2$, apparent density: 0.158 g/cm$^3$ (hard), compressibility: 76.0% (hard).

COMPARATIVE EXAMPLE 4

The fourth comparative example of the air filter medium was obtained by laminating the following non-woven fabrics in the same manner as in Example 2, except that PTFE-impregnated glass cloth sheet, which covered the heating roll 19 in the apparatus shown in FIG. 5 had been peeled so that the heating roll 19 has not undergone the non-adhesive treatment.

Non-woven fabric A: ELEVES S0403WDO, a product of Unitika Ltd., basis weight: 40 g/m$^2$, apparent density: 0.143 g/cm$^3$ (soft), compressibility: 70.9% (soft).

Non-woven fabric B: ELEVES S0403WDO, a product of Unitika Ltd.

Pressure loss, collection efficiency and $PF_1$ value obtained in Examples 1–5 and Comparative Examples 1–4 are shown in Table 1 below.

TABLE 1

|  | Pressure Loss (Pa) | Collection Efficiency (%) | $PF_1$ Value |
|---|---|---|---|
| Example 1 | 229 | 99.9999954 | 31.4 |
| Example 2 | 238 | 99.9999629 | 26.5 |
| Example 3 | 240 | 99.9999582 | 26.0 |
| Example 4 | 245 | 99.9999722 | 26.2 |
| Example 5 | 243 | 99.9999629 | 25.9 |
| Comparative Example 1 | 249 | 99.9995730 | 21.1 |
| Comparative Example 2 | 251 | 99.9996380 | 21.3 |
| Comparative Example 3 | 248 | 99.9994895 | 20.9 |
| Comparative Example 4 | 245 | 99.9995916 | 21.6 |

As seen in the Table 1, the filter media of Examples 2–5, in which a soft non-woven fabric was laminated on at least one side of the porous PTFE film, showed a smaller decrease in collection efficiency and $PF_1$ value from those of Example 1 than the filter media of Comparative Examples 1–4. In other words, the filter media of Examples 2–5 had higher performance than Comparative Examples 1–4. Further, in Comparative Example 4, which was the same as Example 2 except that the heating roll has not undergone a non-adhesive treatment, a decrease in collection efficiency was larger than Example 2. In other words, by laminating non-woven fabric on the heating roll that has undergone a non-adhesive treatment, a decrease in collection efficiency was effectively suppressed.

Furthermore, the filter medium of the Comparative Example 4 had poor appearance, with peeling occurring between the porous PTFE film and the non-woven fabric B.

EXAMPLE 6

Referring to FIG. 2, first, the air filter medium manufactured in Example 4 was pleated using a reciprocating folding machine such that each turn of the pleat is 5.5 cm long. After pleating, folds were set by heating the filter medium at 90° C. Thereafter, the pleated air filter medium was unfolded in order to apply spacers made of a polyamide hot melt resin on the filter medium. Then, the filter medium was again pleated with the reciprocating raising machine. Thereafter, the filter medium was cut into a size of 58 cm×58 cm to obtain an air filter pack. The distance between pleats was 3.125 mm.

Then, a frame of anodized aluminum having an outer size of 61 cm×61 cm, an inner size of 58 cm×58 cm, and a depth of 6.5 cm was provided. The pleated air filter pack 51 was fitted to this frame, and periphery of the air filter pack 51*a* nd the aluminum frame were sealed with a urethane adhesive, thereby obtaining an air filter unit.

COMPARATIVE EXAMPLE 5

An air filter unit was produced in the same manner as in Example 6 except for using the filter medium manufactured in Comparative Example 1.

Pressure loss, collection efficiency and $PF_2$ value of the air filter units of Example 6 and Comparative Example 5 are shown in Table 2 below.

TABLE 2

|  | Pressure Loss (Pa) | Collection Efficiency (%) | $PF_2$ Value |
|---|---|---|---|
| Example 6 | 72 | 99.9999926 | 96.4 |
| Comparative Example 5 | 75 | 99.9999146 | 79.8 |

As seen in Table 2, the $PF_2$ value of the Example 6 air filter unit, which has been manufactured using a filter medium having a soft non-woven fabric laminated on at least one side of the porous PTFE film, was higher than that of the Comparative Example 5 air filter unit, which has been manufactured using a filter medium having a hard non-woven fabric laminated on both sides of the porous PTFE film.

According to the present invention, a softer material is used as a non-woven fabric in an air filter medium. Therefore, the porous PTFE film receives less damages from the non-woven fabric at the time of laminating. As a result, an increase in pressure loss and a decrease in collection efficiency of the filter medium can be suppressed, such that an air filter medium having high performance can be obtained.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An air filter medium, comprising:

a porous polytetrafluoroethylene film; and a non-woven fabric laminated on at least one side of said porous film, said non-woven fabric on at least one side of said porous film having an apparent density satisfying the equation:

apparent density $(g/cm^3) < 1.5 \times$ (basis weight $(g/m^2)/1000) + 0.11$, said non-woven fabric on at least one side of said porous film having a compressibility satisfying the equations:

compressibility $(\%) < 0.2 \times$ (basis weight $(g/m^2)) + 66$, and compressibility $(\%) = (d_{1000} \, (\mu m)/d_{20} \, (\mu m)) \times 100$, where $d_{1000}$ ($\mu$m) is a thickness ($\mu$m) of said non-woven fabric under a load of 98 (kPa) and $d_{20}$ ($\mu$m) is a thickness ($\mu$m) of said non-woven fabric under a load of 1.96 (kPa), said porous polytetrafluoroethylene film having a Performance Factor value of at least 22 subsequent to lamination with said non-woven fabric.

2. The air filter medium according to claim 1, wherein said non-woven fabric on at least one side of said porous film is made of composite fibers having a core-shell structure with a core portion and a shell portion, said core portion being made of a first material with a first melting point and said shell portion being made of a second material with a second melting point, said first melting point being higher than said second melting point.

3. A process of producing an air filter medium, comprising:
   making a porous film from a polytetrafluoroethylene; and
   laminating a non-woven fabric on at least one side of said porous film on a heating roll that has undergone a non-adhesive treatment such that said porous polytetrafluoroethylene film has a Performance Factor value of at least 22 subsequent to lamination with said non-woven fabric,
   said non-woven fabric on at least one side of said porous film having an apparent density satisfying the equation:

apparent density $(g/cm^3) < 1.5 \times$(basis weight $(g/m^2)/1000) + 0.11$.

4. The process of producing a filter medium according to claim 3, wherein
   said non-woven fabric on at least one side of said porous film has a compressibility satisfying the following equations:

compressibility $(\%) < 0.2 \times$(basis weight $(g/m^2)) + 66$, and compressibility $(\%) = (d_{1000} (\mu m)/d_{20} (\mu m)) \times 100$, where $d_{1000}$ ($\mu$m) is a thickness ($\mu$m) of said non-woven fabric under a load of 98 (kPa) and $d_{20}$ ($\mu$m) is a thickness ($\mu$m) of said non-woven fabric under a load of 1.96 (kPa).

5. The process of producing a filter medium according to claim 3, wherein
   said non-woven fabric on at least one side of said porous film is made of composite fibers having a core-shell structure with a core portion and a shell portion, said core portion being made of a first material with a first melting point and said shell portion being made of a second material with a second melting point, said first melting point being higher than said second melting point.

6. The process of producing a filter medium according to claim 3, wherein
   said non-adhesive treatment includes applying a non-adhesive sheet to a surface of the heating roll; and
   said non-adhesive sheet is formed by impregnating a sheet made of a glass fiber material with a fluorine resin material.

7. An air filter pack for air filters, comprising:
   a filter medium having a predetermined shape, said filter medium including
      a porous film made of polytetrafluoroethylene; and
      a non-woven fabric laminated on at least one side of said porous film, said non-woven fabric on at least one side of said porous film having an apparent density satisfying the equation:

apparent density $(g/cm^3) < 1.5 \times$(basis weight $(g/m^2)/1000) + 0.11$, said porous polytetrafluoroethylene film having a Performance Factor value of at least 22 subsequent to lamination with said non-woven fabric.

8. The air filter pack according to claim 7, wherein
   said non-woven fabric on at least one side of said porous film has a compressibility satisfying the equations:

compressibility $(\%) < 0.2 \times$(basis weight $(g/m^2)) + 66$, and compressibility $(\%) = (d_{1000} (\mu m)/d_{20} (\mu m)) \times 100$, where $d_{1000}$ ($\mu$m) is a thickness ($\mu$m) of said non-woven fabric under a load of 98 (kPa) and $d_{20}$ ($\mu$m) is a thickness ($\mu$m) of said non-woven fabric under a load of 1.96 (kPa).

9. The air filter pack according to claim 7, wherein said non-woven fabric on at least one side of said porous film is made of composite fibers having a core-shell structure with a core portion and a shell portion, said core portion being made of a first material with a first melting point and said shell portion being made of a second material with a second melting point, said first melting point being higher than said second melting point.

10. An air filter unit for air cleaning, comprising:
    a frame; and
    an air filter pack having a filter medium with a predetermined shape that is coupled to said frame, said filter medium including
       a porous polytetrafluoroethylene film, and
       a non-woven fabric laminated on at least one side of said porous film, said non-woven fabric on at least one side of said porous film having an apparent density satisfying the equation:

apparent density $(g/cm^3) < 1.5 \times$(basis weight $(g/m^2)/1000) + 0.11$, said porous polytetrafluoroethylene film having a Performance Factor value of at least 22 subsequent to lamination with said non-woven fabric.

11. The air filter unit according to claim 10, wherein
    said non-woven fabric on at least one side of said porous film has a compressibility satisfying the equations:

compressibility $(\%) < 0.2 \times$(basis weight $(g/m^2)) + 66$, and compressibility $(\%) = (d_{1000} (\mu m)/d_{20} (\mu m)) \times 100$, where $d_{1000}$ ($\mu$m) is a thickness ($\mu$m) of said non-woven fabric under a load of 98 (kPa) and $d_{20}$ ($\mu$m) is a thickness ($\mu$m) of said non-woven fabric under a load of 1.96 (kPa).

12. The air filter unit according to claim 10, wherein
    said non-woven fabric on at least one side of said porous film is made of composite fibers having a core-shell structure with a core portion and a shell portion, said core portion being made of a first material with a first melting point and said shell portion being made of a second material with a second melting point, said first melting point being higher than said second melting point.

* * * * *

UNITED STATES PATENT AND TRADEMARK OFFICE
CERTIFICATE OF CORRECTION

PATENT NO.    : 6,682,576 B1
DATED         : January 27, 2004
INVENTOR(S)   : Hideyuki Kiyotani et al.

It is certified that error appears in the above-identified patent and that said Letters Patent is hereby corrected as shown below:

<u>Title page,</u>
Item [73], Assignee, shown as "Daikin Industries" should read
-- Daikin Industries, Ltd. --

Signed and Sealed this

Thirtieth Day of March, 2004

JON W. DUDAS
*Acting Director of the United States Patent and Trademark Office*